US006643055B1

(12) United States Patent
Askinger et al.

(10) Patent No.: US 6,643,055 B1
(45) Date of Patent: Nov. 4, 2003

(54) OPTICAL AMPLIFIER CONTROL (76) Inventors: Tomas Askinger, Hövdingagatan 21, S-126 52 Hägersten (SE); Bengt Johansson, Naumannsv. 19, S-129 38 Hägersten (SE); Nigel Robert Wood, Kungssätravägen 52, S-127 37 Skärholmen (SE)

( * ) Notice: Subject to any disclaimer, the term of this patent is extended or adjusted under 35 U.S.C. 154(b) by 0 days.

(21) Appl. No.: 09/530,178
(22) PCT Filed: Oct. 5, 1998
(86) PCT No.: PCT/SE98/01795
§ 371 (c)(1),
(2), (4) Date: Nov. 27, 2000
(87) PCT Pub. No.: WO99/21302
PCT Pub. Date: Apr. 29, 1999

(30) Foreign Application Priority Data

Oct. 21, 1997 (SE) ................................................ 9703000

(51) Int. Cl.[7] .................................................. H01S 3/00
(52) U.S. Cl. .................................................. 359/337.12
(58) Field of Search ..................................... 359/337.12

(56) References Cited

U.S. PATENT DOCUMENTS

| 4,991,229 A |   | 2/1991  | Nelson et al. ............... 455/605 |
| 5,374,973 A |   | 12/1994 | Maxham et al. ............. 359/341 |
| 5,396,360 A |   | 3/1995  | Majima ....................... 359/133 |
| 5,699,081 A | * | 12/1997 | Denkin et al. ........... 359/337.12 |
| 5,764,404 A | * | 6/1998  | Yamane et al. ......... 359/337.12 |
| 5,828,486 A | * | 10/1998 | Yoshida .................. 359/337.12 |
| 5,838,488 A | * | 11/1998 | Kobayashi ............... 359/341.41 |
| 5,861,980 A | * | 1/1999  | Ono ........................ 359/337.12 |
| 5,966,236 A | * | 10/1999 | Okuno ........................ 359/337 |
| 5,995,276 A | * | 11/1999 | Tajima et al. .......... 359/337.12 |
| 6,023,366 A | * | 2/2000  | Kinoshita ............... 359/337.12 |
| 6,055,093 A | * | 4/2000  | Chikuma et al. ............ 359/337 |

FOREIGN PATENT DOCUMENTS

| GB | 2 294 170    | 4/1996 | ............ H04B/10/17 |
| WO | WO 97/28584  | 1/1997 | ............. H01S/3/00 |
| WO | WO 97/06616  | 2/1997 | ............. H04J/14/02 |

OTHER PUBLICATIONS

International Search Report, PCT/SE 98/01795, dated Mar. 16, 1999.

* cited by examiner

Primary Examiner—Thomas G. Black
Assistant Examiner—Deandra M. Hughes
(74) Attorney, Agent, or Firm—Jenkens & Gilchrist, P.C.

(57) ABSTRACT

A system and method for controlling the output power of an optical amplifier in a node in a network, wherein the output power of the amplifier is controlled via a pump laser in a control circuit. The node reads a supervisory channel comprising information on how to control the amplifier. The node then uses the information for the control of the amplifier.

17 Claims, 9 Drawing Sheets

*Prior Art*

*Prior Art*

OPTICAL AMPLIFIER CONTROL

TECHNICAL FIELD OF THE INVENTION

The present invention relates to a method for controlling the output power of optical amplifiers, particularly in nodes in a network, and to a node in a network.

DESCRIPTION OF RELATED ART

Wave Division Multiplexing (WDM) is a technology allowing the transmission of a number of optical signals through an optical fibre using different separated light wavelengths. In this way the information carrying capacity may be increased significantly. The capacity depends on the bandwidth of the channels and the number of used wavelength channels. The signal at each wavelength travels through the fibre irrespectful of the other signals, so that each signal represents a discrete channel with large bandwidth.

When signals are sent long distances the signals have to be regenerated or optically amplified at intervals. An optical amplifier may comprise an erbiumdoped fibre that is being pumped by a high power semiconductor laser, here called "pump laser" for short.

The optical amplifier differs from the electrical amplifier in that the optical amplifier strives to keep a constant output power, since they normally are in a more or less saturated state, while the electrical amplifier has constant gain.

That the output power is constant gives problems if the number of channels are changed—by purpose or by a fault. It may therefore be desirable to be able to control the output power.

It is earlier known to control the gain in an optical amplifier by using pilot tones, see EP 0 637 148 A1. An identifying pilot tone is being modulated on each multiplexed wavelength. Each amplifier in the system decides from the pilot tone the total number of sent wavelengths and therefore gives a corresponding control of the gain of the amplifier. Either feedforward or feedback is used. In the document is also hinted that in the addition to the count of the number of channels the amplitude of the pilot tones could be measured to obtain a better control.

It is also earlier known, see GB 2 294 170, to control the amplifier in different ways by measuring total optical effect on the output of the amplifier, transforming it to a voltage and comparing it with a reference voltage. This gives a feedback signal that controls the amplifier. As an addition the number of channels may be counted and the control may be adjusted accordingly.

Further it is known, see U.S. Pat. No. 4,991,229, to control an optical amplifier by measuring the power in only one wavelength channel. This is done by filtering out said channel with the aid of a WDM-coupler and then detecting the channel. Otherwise, feedback is made on a similar way as above.

In U.S. Pat. No. 5,113,459 is shown an idea of using a special channel for optical service signalling.

SUMMARY

The problems with modulating identifying pilot tones on each multiplexed wavelength in order to be able to count the wavelengths is that it is complicated, slow and expensive.

Another problem is that it also influences the transmission performances in a negative way.

The purpose of the present invention is to provide a simple and effective power per channel control of amplifiers in nodes in a network forming a bus. In order to do that a simple, fast and cheap way of counting the channels entering each amplifier is accomplished.

The counting of channels is achieved by using a separate channel for signalling between the nodes, wherein the number n of channels is transmitted between the nodes. An alternative would be to use a separate electrical network, which however is slower.

The first node of the bus sets the number n to the number of active transmitters in the node. The rest of the nodes updates the number n by adding the number of channels that they are adding to the bus and by subtracting the number of channels that they are blocking or terminating.

In an embodiment of the invention large and fast input power changes are detected, which may be due to a fault, which in its turn would make the number n coming in to the node outdated. In that case the updating of the number n is inhibited until a new and trustable number n is received.

The advantages with the invention is that it is simple, fast and cheap.

DESCRIPTION OF PREFERRED EMBODIMENTS

Optical Amplifiers

Figure 1:
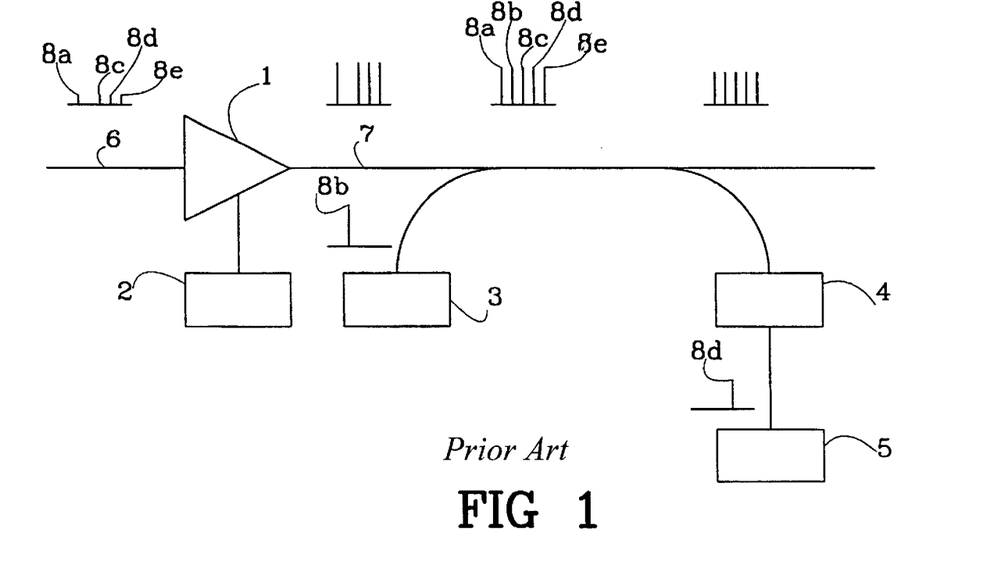
FIG. 1 shows a block diagram of a known optical system optimised for five channels in accordance with the prior art.

FIG. 1 shows in accordance with prior art an optical system optimised for five channels $8a$, $8b$, $8c$, $8d$ and $8e$ using wavelength division multiplexing. The system can be part of the telephone system for example. In the optical system, an optical amplifier 1 has constant output power. The amplifier 1 is controlled by a pump laser 2. An optical fibre 6 leads into the amplifier 1 from other nodes in the system and an optical fibre 7 leads from the amplifier 1 to other nodes in the system. In the fibre 6, 7 channels can be added and dropped. In the example shown, four channels $8a$, $8c$, $8d$, $8e$ come through the first fibre 6 into the amplifier 1, are amplified and exit in the second fibre 7. An additional channel $8b$ is thereafter added from a transmitter 3. All of the channels $8a$, $8b$, $8c$, $8d$, $8e$ will then be of the same strength and one selected cannel 8d can be read by a filter 4 selecting the specific wavelength of the selected channel 8d and sending it on to a receiver 5. All of the channels 8a, 8b, 8c, 8d, 8e decrease in strength the farther they travel, but since they are of equal strength there is no problem in reamplifying them.

Figure 2:
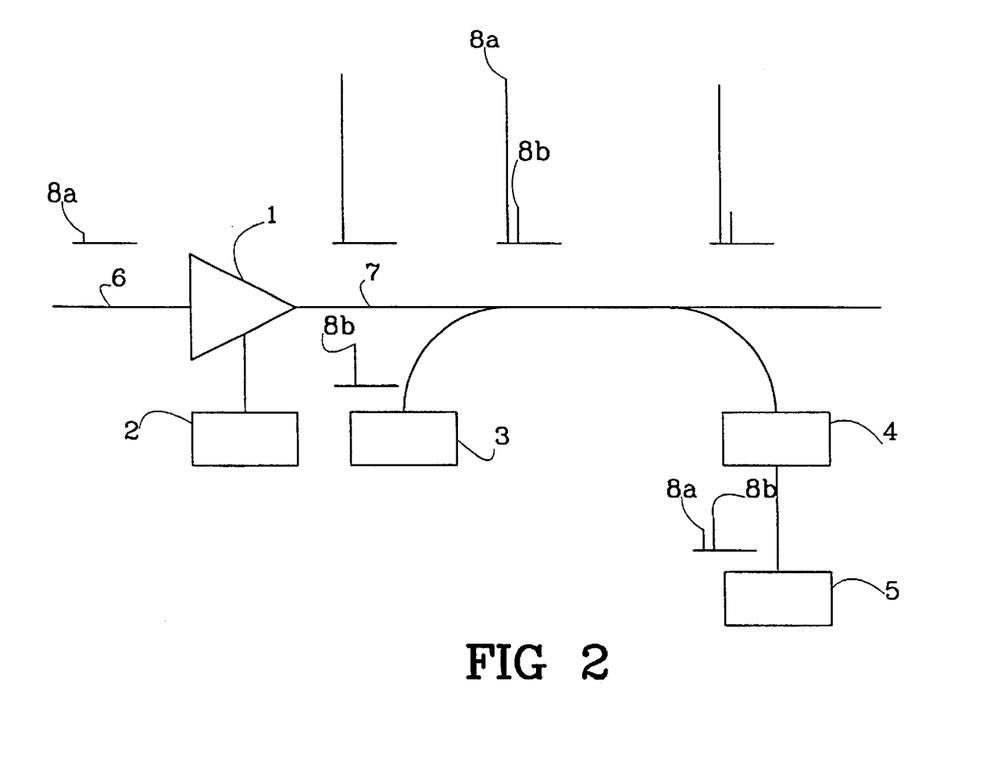
FIG. 2 shows a block diagram of the same system as in FIG. 1, but with only two channels present, and with no amplifier control.

FIG. 2 shows the same system as in FIG. 1. In this case the system is still optimised for five channels, but only a first channel 8a comes into the amplifier 1. This single channel 8a will then become approximately four times as strong as if there had been four channels which had been amplified. This is due to the fact that the total output power from an optical amplifier is in principal constant, i.e. the output power depends actually primarily on the output power from the pump laser 2 coupled to the amplifier and less on the input power to the amplifier 1.

When a second channel 8b is then added there will be an unbalance between the channels 8a and 8b, which results in problems. The filter 4 is in practice not ideal, so when the filter 4 attempts to select out the second channel 8b, the first channel 8a will predominate since it is so strong and cross talk can occur.

It is thus very desirable to be able to control the output power of channels passing the amplifier 1.

Optical Ring Network

Figure 3:
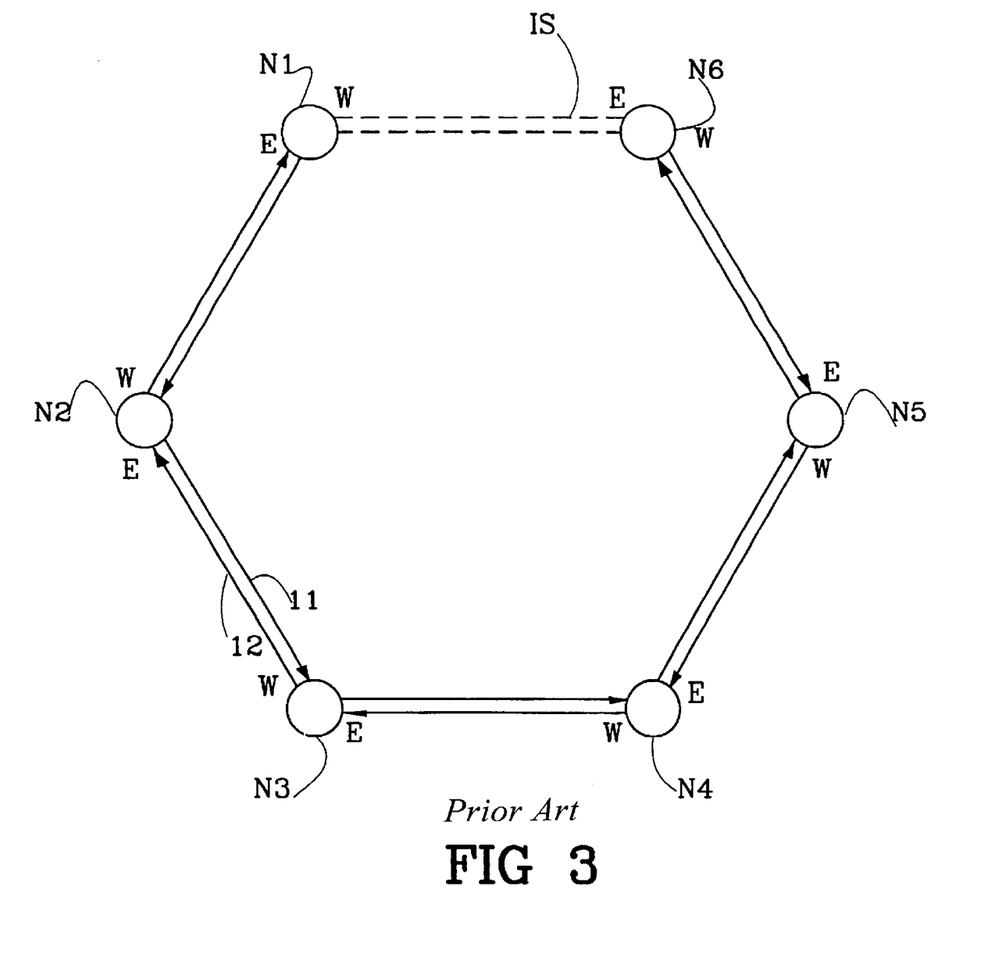
FIG. 3 shows an example of a known optical network.

In FIG. 3 is shown an example of a known optical ring network using wavelength division multiplexing, which will be called a "ring" for short. The ring network in FIG. 3 will be used as a basis for the explanation of the invention below, but it is to be understood that the invention would work in other networks as well.

In FIG. 3 six nodes N1, N2, N3, N4, N5, N6 are connected to two optical fibres 11, 12 working in opposite directions, that is working as a bi-directional bus. Of course it is possible to have any number of nodes on the ring.

The place where traffic enters the node from the first fibre 11 and leaves the node on the second fibre 12 will be called the west port W. The place where traffic enters the node from the second fibre 12 and leaves the node on the first fibre 11 will be called the east port E. The definition of "west" and "east" will be connected to this and nothing else, which means that west may be to the right of east. It could be helpful to picture the ring as the Equator.

Data traffic and signalling from one node to another will be sent on both fibres 11, 12, that is in both directions. However, between two of the nodes N1, N6, a segment of the ring, called an inactive segment IS, does not carry any data traffic, only signalling. This means that even though data traffic is sent on both fibres, a node will only receive data traffic from another node on one of the fibres. The nodes N1, N6 closest to the inactive segment IS will work as end-nodes. If a fault occurs in a segment on the ring that is not the inactive segment, then the inactive segment will be moved to encompass the fault.

There are different ways of accomplish the moving of the inactive segment in practise. That is, however, beyond the scope of the present invention. Interested readers may read for example "Electronic letters", Dec. 5th, 1996, Vol.32, No 25, p 2338–2339, B. S. Johansson, C. R. Batchellor and L. Egnell: "Flexible bus: A self-restoring optical ADM ring architecture".

Optical Nodes

Figure 4:
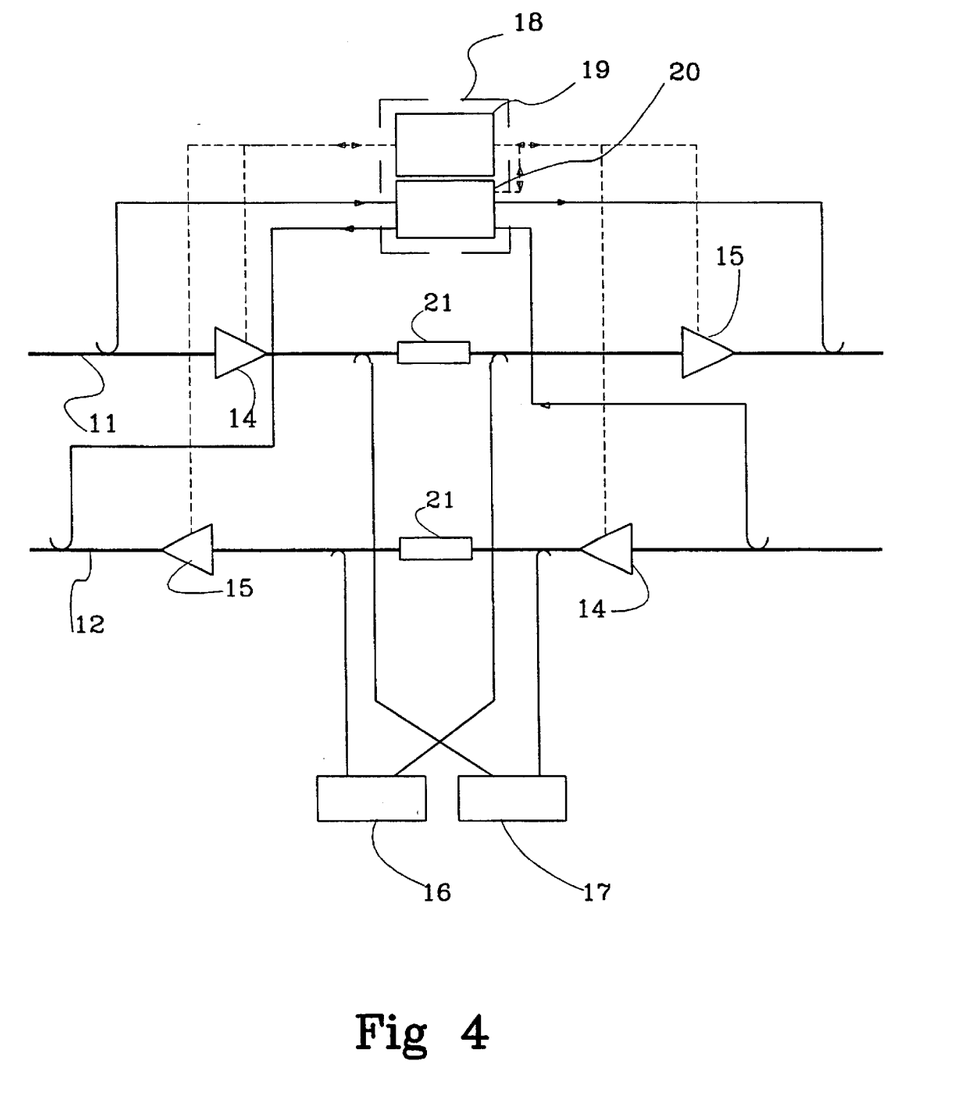
FIG. 4 shows an example of a node in an optical network that may be used for the implementation of the invention.

The most important features of a node in which the invention may be implemented may be seen in FIG. 4. Other nodes are possible, for example nodes that terminate the channels in each node.

On each fibre 11, 12 the node comprises a preamplifier 14, and a booster amplifier 15. The preamplifiers 14 and the booster amplifiers 15 are preferably optical fibre amplifiers (OFA). The preamplifier 15 may work as a switch to accomplish the inactive segment IS, but it is also possible to use the booster amplifier 15 or a separate switch for the purpose.

The node further comprises multiplexers/transmitters 16 for adding wavelength channels to the fibres 11, 12 and demultiplexers/receivers 17 for dropping wavelength channels from the fibres 11, 12.

The node further comprises a central module 18, which in its turn comprises a central processor 19 and.a supervisory unit 20. The central processor 19 controls everything. The supervisory unit 20 sends signalling in a separate supervisory channel OSC. According to the ITU-T standard draft G.mcs (Study group 15-contribution, Question: 16/15), the wavelength of a supervisory channel is preferably 1510 nm. Other wavelengths are of course possible.

An advantage with using 1510 nm is that the preamplifiers 14 preferably have a 1530 nm filter implemented to suppress the gain peak. This filter may be used to block the 1510 nm supervisory channel. This unnecessitates the use of a separate inline supervisory channel filter or an inline WDM coupler in the node. However, for the supervisory channel it could be advantageous of power saving reasons to use a WDM coupler inline.

The data traffic, that is the data communication channels, on the other hand, may for example use sixteen wavelengths centred around 1550 nm, with 100 GHz spacing.

Optionally there are also blocking filters 21 between the preamplifiers 14 and the booster amplifiers 15.

Channel Counting

As was said above it is desirable to operate the optical amplifiers in a constant power per channel mode. This could be done by measuring the total output power and dividing it with the number of channels passing the amplifier. To do that it is necessary to know how many channels that are passing the amplifier, which is not as easy to find out as it sounds.

Figure 5:
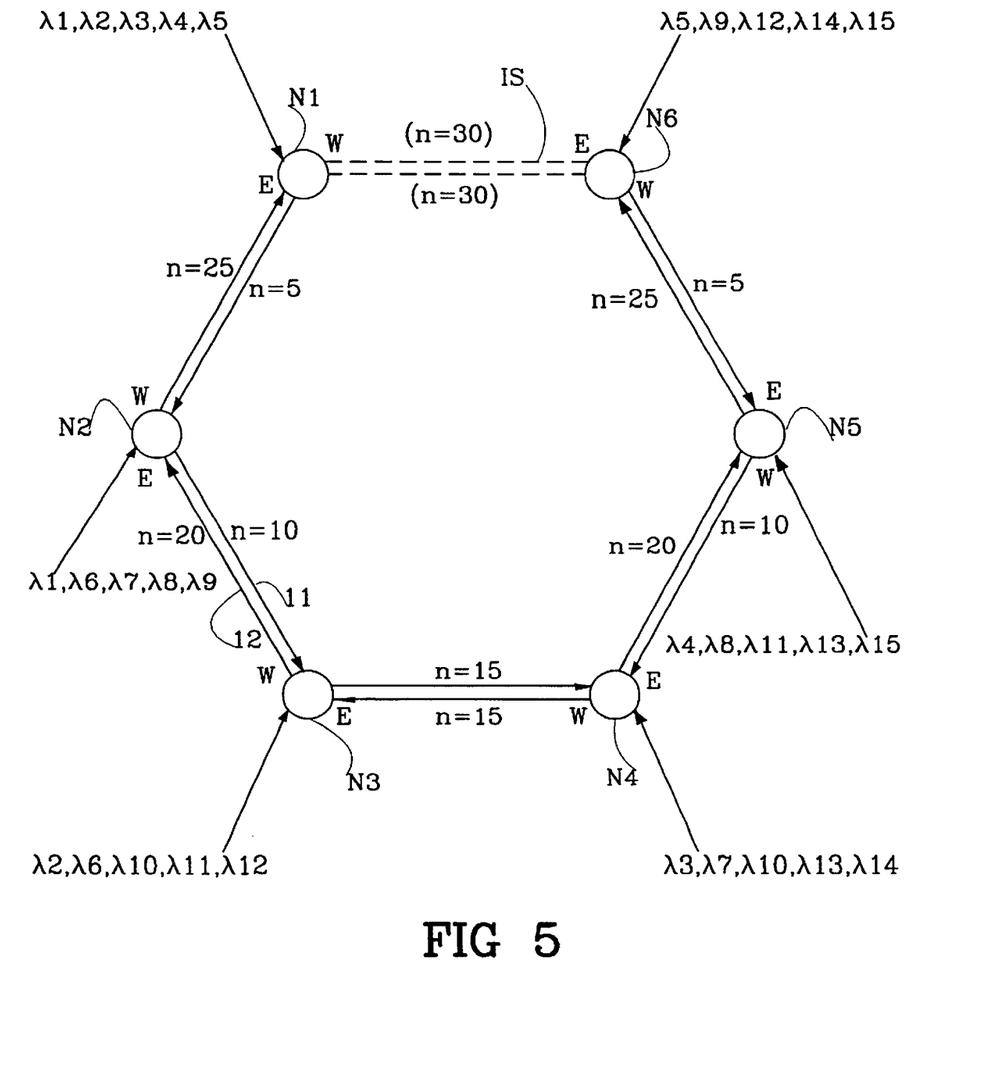
FIG. 5 shows the optical network of FIG. 3, with counting of channels according to the invention in nodes without filters.
Figure 6:
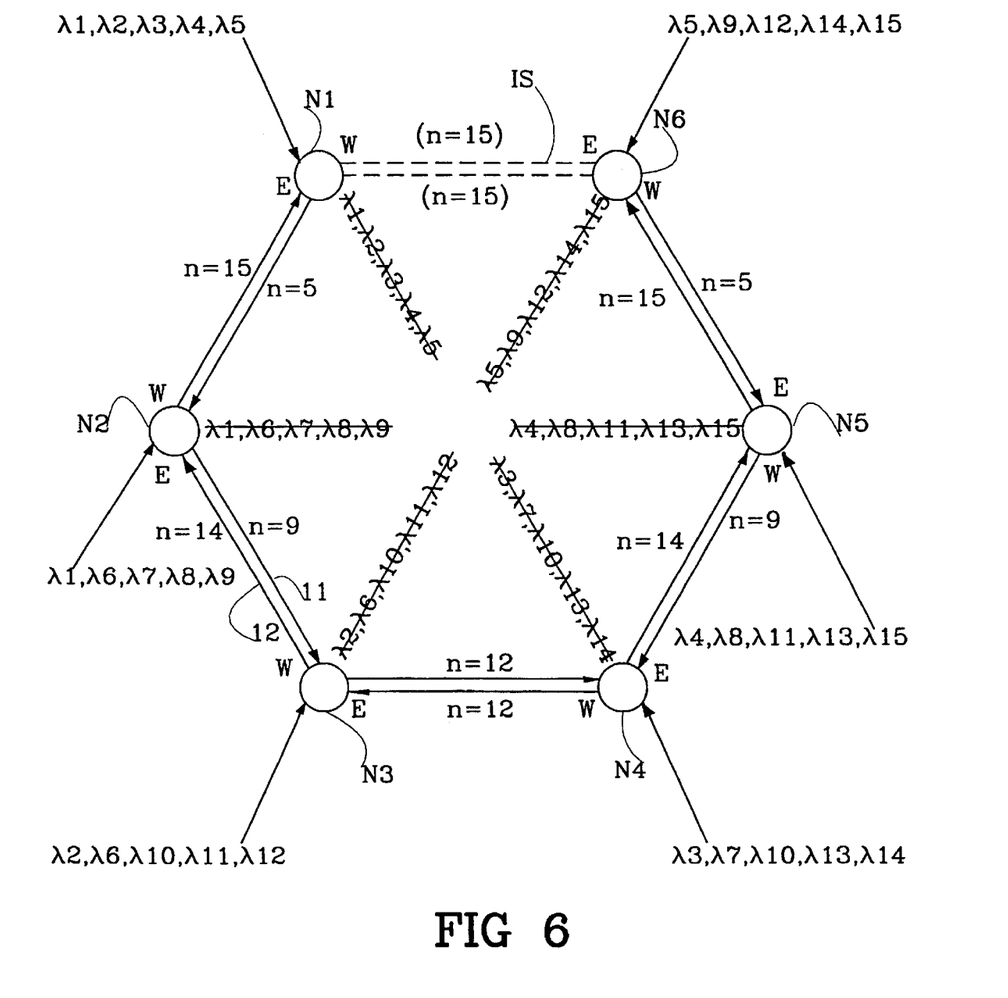
FIG. 6 shows the optical network of FIG. 3, with counting of channels according to the invention in nodes with filters.

The basic idea according to the invention, shown in FIGS. 5 and 6, is that each node receives information from the node upstreams on the number n of channels present. After having inserted, terminated or blocked channels the node updates the number n and transmits it to next node downstream.

The number n could be updated through an electrical network, but it would take several tens of seconds for the updated number n to be distributed to all the amplifiers. This could mean a performance degradation of the traffic signals during the time to update the number n. A better idea is probably to use the aforementioned optical supervisory channel OSC.

As was said earlier, a node transmits data in both directions. The same wavelength is preferably used to communicate from a first node N1 to a second node N2, as from the second node N2 to the first node N1.

If there is not a blocking filter in the second node N2, a channel received in the second node N2 is not terminated or blocked in the second node, but passes and continues downstream. If there had not been an inactive segment IS it would in this case not work to use the same wavelength. That is because data from the first node would be mixed with data from the second node and thus become unreadable. However, the inactive segment introduces a break in the ring, which stops the data traffic.

This means that on the paths between the first N1 and the second N2 nodes where the inactive segment IS is not situated, data is not mixed. On the other hand, on the paths between the first N1 and the second N2 nodes where the inactive segment IS is situated, data will be mixed. This is of no importance, since that mixed data is stopped by the inactive segment IS and is not read anyway.

This is a very simple solution. However, on each wavelength used, two channels will be superimposed in certain parts of the ring. This means that the power of a wavelength is doubled and that the amplifiers in the nodes have to count that wavelength as two channels in those parts of the ring.

This is perhaps more clarified in the example in FIG. 5, which is the same as FIG. 3. The first node N1 transmits five channels on the following wavelengths: $\lambda 1$ destined for the second node N2, $\lambda 2$ destined for the third node N3, $\lambda 3$ destined for the fourth node N4, $\lambda 4$ destined for the fifth node N5 and finally, $\lambda 5$ destined for the sixth node N6. Since the first node N1 is an end-node, data is only transmitted eastwards, n=5.

The second node N2 transmits five channels on the following wavelengths: $\lambda 1$ destined for the first node N1, $\lambda 6$ destined for the third node N3, $\lambda 7$ destined for the fourth node N4, $\lambda 8$ destined for the fifth node N5 and finally, $\lambda 9$ destined for the sixth node N6.

The second node N2 receives a channel from the first node N1 on wavelength $\lambda 1$ and transmits a channel to the first node N1 on the same wavelength $\lambda 1$. On the east path from the second node N2 to the first node N1 the wavelength $\lambda 1$ will thus contain two superimposed channels (which, however, are stopped at the input of the first node N1 or at the output of the sixth node N6, due to the inactive segment). These two channels are not readable at the moment, but must anyway be counted as two, since the power level is doubled.

Hence, the second node N2 transmits eastwards the five channels on the wavelengths $\lambda 1$–$\lambda 5$ from the first node N1 adding five channels on the wavelengths $\lambda 1$, $\lambda 6$–$\lambda 9$. Thus, there are nine wavelengths used, but ten channels, n=10.

The third node N3 transmits five channels on the following wavelengths: $\lambda 2$ destined for the first node N1, $\lambda 6$ destined for the third node N3, $\lambda 10$ destined for the fourth node N4, $\lambda 11$ destined for the fifth node N5 and finally, $\lambda 12$ destined for the sixth node N6.

Hence, the third node N3 transmits eastwards the ten channels on the wavelengths $\lambda 1$–$\lambda 9$ from the first N1 and second N2 nodes, adding five channels on the wavelengths $\lambda 2$, $\lambda 6$, $\lambda 10$–$\lambda 12$. Thus, there are twelve wavelengths used, but fifteen channels, n=15.

The fourth node N4 transmits five channels on the following wavelengths: $\lambda 3$ destined for the first node N1, $\lambda 7$ destined for the second node N2, $\lambda 10$ destined for the fifth node N5, $\lambda 13$ destined for the fifth node N5 and finally, $\lambda 14$ destined for the sixth node N6.

Hence, the fourth node N4 transmits eastwards the fifteen channels on the wavelengths $\lambda 1$–$\lambda 12$ from the first N1, second N2 and third N3 nodes, adding five channels on the wavelengths $\lambda 3$, $\lambda 7$, $\lambda 10$, $\lambda 13$, $\lambda 14$. Thus, there are fourteen wavelengths used, but twenty channels, n=20.

The fifth node N5 transmits five channels on the following wavelengths: $\lambda 4$ destined for the first node N1, $\lambda 8$ destined for the second node N2, $\lambda 11$ destined for the third node N3, $\lambda 13$ destined for the fourth node N4, and finally, $\lambda 15$ destined for the sixth node N6.

Hence, the fifth node N5 transmits eastwards the twenty channels on the wavelengths $\lambda 1$–$\lambda 14$ from the first N1, second N2, third N3 and fourth N4 nodes, adding five channels on the wavelengths $\lambda 4$, $\lambda 8$, $\lambda 11$, $\lambda 13$, $\lambda 15$. Thus, there are fifteen wavelengths used, but twenty-five channels, n=25.

Finally, the sixth node N6 transmits five channels on the following wavelengths: $\lambda 5$ destined for the first node N1, $\lambda 9$ destined for the second node N2, $\lambda 12$ destined for the third node N3, $\lambda 14$ destined for the fourth node N4, and finally $\lambda 15$ destined for the fifth node N5.

The sixth node N6 transmits data both eastwards and westwards, but data eastwards is stopped by the inactive segment.

However, the sixth node N6 transmits five channels westwards on the wavelengths $\lambda 5$, $\lambda 9$, $\lambda 12$, $\lambda 14$, $\lambda 15$. This ends up to fifteen wavelengths used around the ring corresponding to thirty channels, n=30. In another network, without an inactive segment IS, there would have been a necessity of thirty wavelengths corresponding to the thirty channels. The counting would be the same, however, since it is the channels that are counted.

The sixth node N6, being an end-node resets the number of channels n westwards, adding the number of active transmitters, n=5. Then the same procedure happens westwards as was explained eastwards, n=10, n=15, n=20, n=25, (n=30), each node using the same wavelengths both eastwards and westwards.

The equation for calculating the number of channels in FIG. 5 will be $n_y = n_x + z$, where $n_x$ equals the number n coming in to the node, $n_y$ equals the number n going out from the node, and z equals the number of channels added in the node, that is the number of active transmitters in the node.

FIG. 6 shows the same network as FIG. 5, but the optional filter 21 is used in all nodes N1–N6. This is more expensive, but on the other hand no "double" channels will have to be amplified. The filter in a node removes the same wavelengths that are used for transmitting from and receiving to the node. In the figure the blocked wavelengths are marked by strikethrough ~~$\lambda 1$~~.

On the east path from the second node N2 to the first node N1 the wavelength $\lambda 1$ will thus not contain two superimposed channels, but only the channel that the second node N2 transmits to the first node N1. Hence, the number of channels will equal the number of wavelengths, that is nine, n=9.

The same will happen further eastwards in the other nodes, compare the calculation of wavelengths in FIG. 5: n=5 n=9, n=12, n=14, n=15, (n=15), ending up with fifteen channels on fifteen wavelengths. Of course, the corresponding will happen also westwards.

Hence, the equation for calculating the number of channels in FIG. 6 will be $n_y = n_x + z - w$, where $n_x$ equals the number n coming in to the node, $n_y$ equals the number n going out from the node, z equals the number of channels added in the node, and w equals the number of channels blocked in the node.

Assuming that all received channels are blocked in a node, then the number of blocked channels w will be equal to the number of active transmitters in the node.

The equation is equally true for FIG. 5, but with w=0. The equation would also be true for a network terminating the channels in each node, with w denoting blocked or terminated channels in the node.

Figure 7:
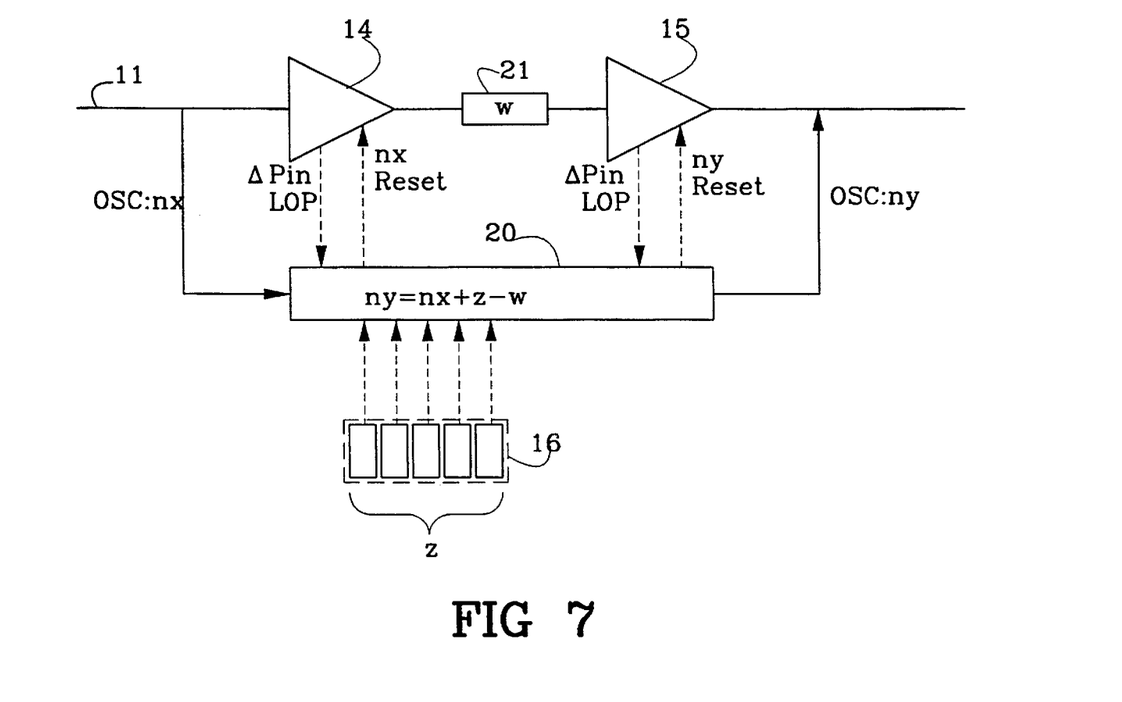
FIG. 7 shows a detailed view of a first embodiment of the implementation of the counting according to the invention.

In FIG. 7 is shown the principle function of an update of the number n in a node like the one in FIG. 4 or similar. The incoming number of channels $n_x$ is used to update the preamplifier 14. The outgoing number of channels $n_y$ is used to update the booster amplifier 15. As was said above, the outgoing number of channels $n_y$ is calculated according to $n_y = n_x + z - w$, where z equals the number of channels added, and w equals the number of channels blocked or terminated, if any.

The process is started with an end-node setting the first number n to the number of active transmitters in the end-node, thus indicating the number of channels.

This is all nice and simple, but in the real world things happen: transmitters may failure, fibres may break or be bent, etc. We have to make sure that the amplifier is not updated with an outdated number n.

A small change of the number n will not influence much if the number n is large. It is the big changes that are mainly interesting. Thus, a input power change limit ΔP which is acceptable is set and measured on the inputs of both the preamplifier 14 and the booster amplifier 15.

If the input power change is less then ΔP, we do not bother at all. If, however, an amplifier detects an input power change greater then ΔP, the amplifier sends an input power change flag ΔPin to the optical supervisory unit 20. It may than be an attenuation change on the line, added/removed transmitters or a fault which has caused the inactive segment to move. In the last case the path proceeding the node could contain a number n that is out of date.

The node, however does not know why the big input power change has occurred. To prevent the node from updating the amplifier with an outdated number n, an inhibit flag is sent internally in the amplifier as soon as the input power change is detected, see also FIG. 10.

This inhibits further updating of the number n until the optical supervisory unit has received a number n that it trusts. Then the optical supervisory unit sends a reset flag to the amplifier(s), which once again allows updating of the number n.

For a 80 km node-to-node distance a delay time of about 400 $\mu$s is needed. After the delay, the optical supervisory unit 20 probably needs to read one frame plus the next coming cyclic redundancy check CRC before it can do an update. That would result in a total delay of about 525 $\mu$s.

A suitable value for the input power change limit ΔP would probably be about 0.5 to 1 dB. Then a change from for example ten to eleven channels will not be noticed, but a change from one to two channels will be detected and of course also a fault which causes the inactive segment to move.

If an input power change flag ΔPin is received from the booster amplifier 15, but not from the preamplifier 14, then there is probably a transmitter fault in the node. Then, the update of the number $n_y$ for the booster amplifier will be inhibited until the optical supervisory unit has received a number $n_x$ that it trusts. This is a fast way of detecting transmitter faults, but is mainly intended for the control of the amplifiers. If there are many channels a transmitter fault will not be noticed, but that on the other hand is no problem for the amplifier. Of course the transmitters should be observed for faults in a usual (slower) way too.

In FIG. 7 there are hardwired buses from the optical supervisory unit 20 to the amplifiers 14, 15 and hard wires to the transmitters 16. Another alternative would be, like in FIG. 8, to use the central unit 19 to supply the amplifiers 14, 15 with the current number of channels n. The optical supervisory unit 20 then makes an update with a trigger signal. A prerequisite in this case, when the first channel is started in the network, is that the amplifiers 14, 15 have a default value of the number n=1. Otherwise it would take too long before the power levels have been adjusted.

Figure 9:
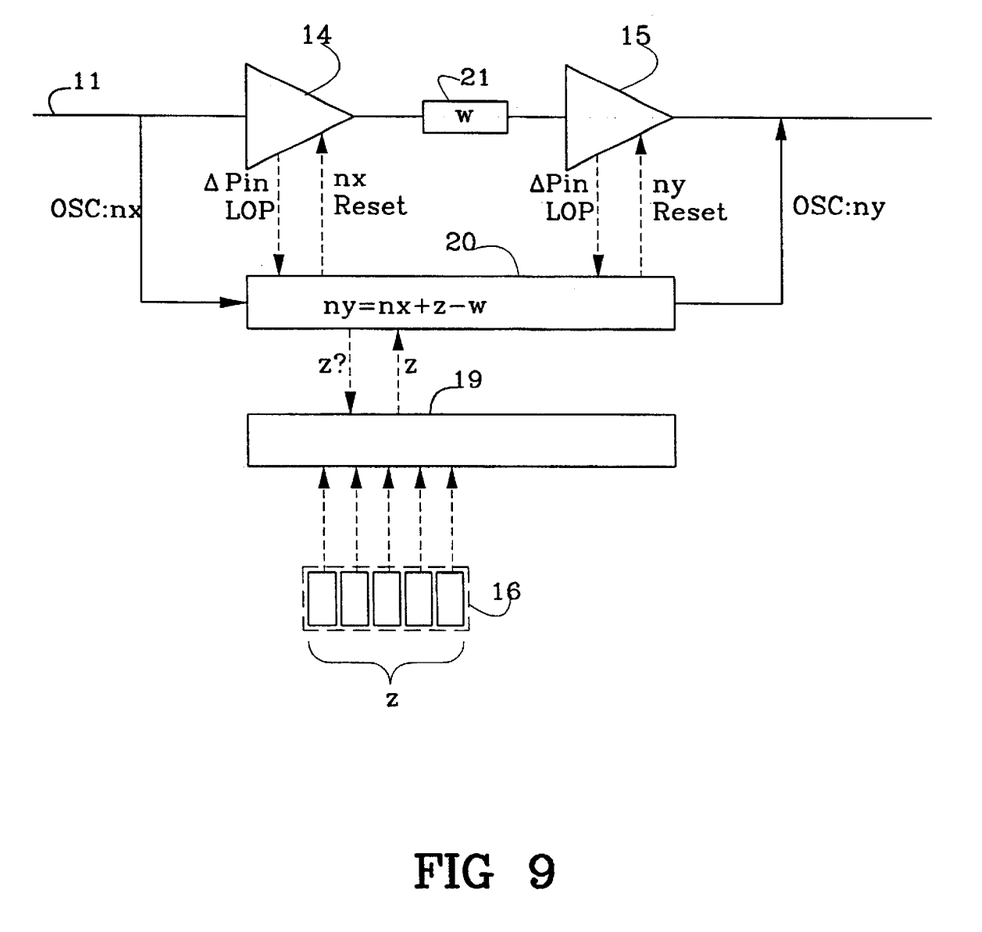
FIG. 9 shows a detailed view of a third embodiment of the implementation of the counting according to the invention.

A third way could be to have hardwired buses to the amplifiers 14, 15, but letting the central unit 19 taking care of the transmitters 16, see FIG. 9.

Figure 8:
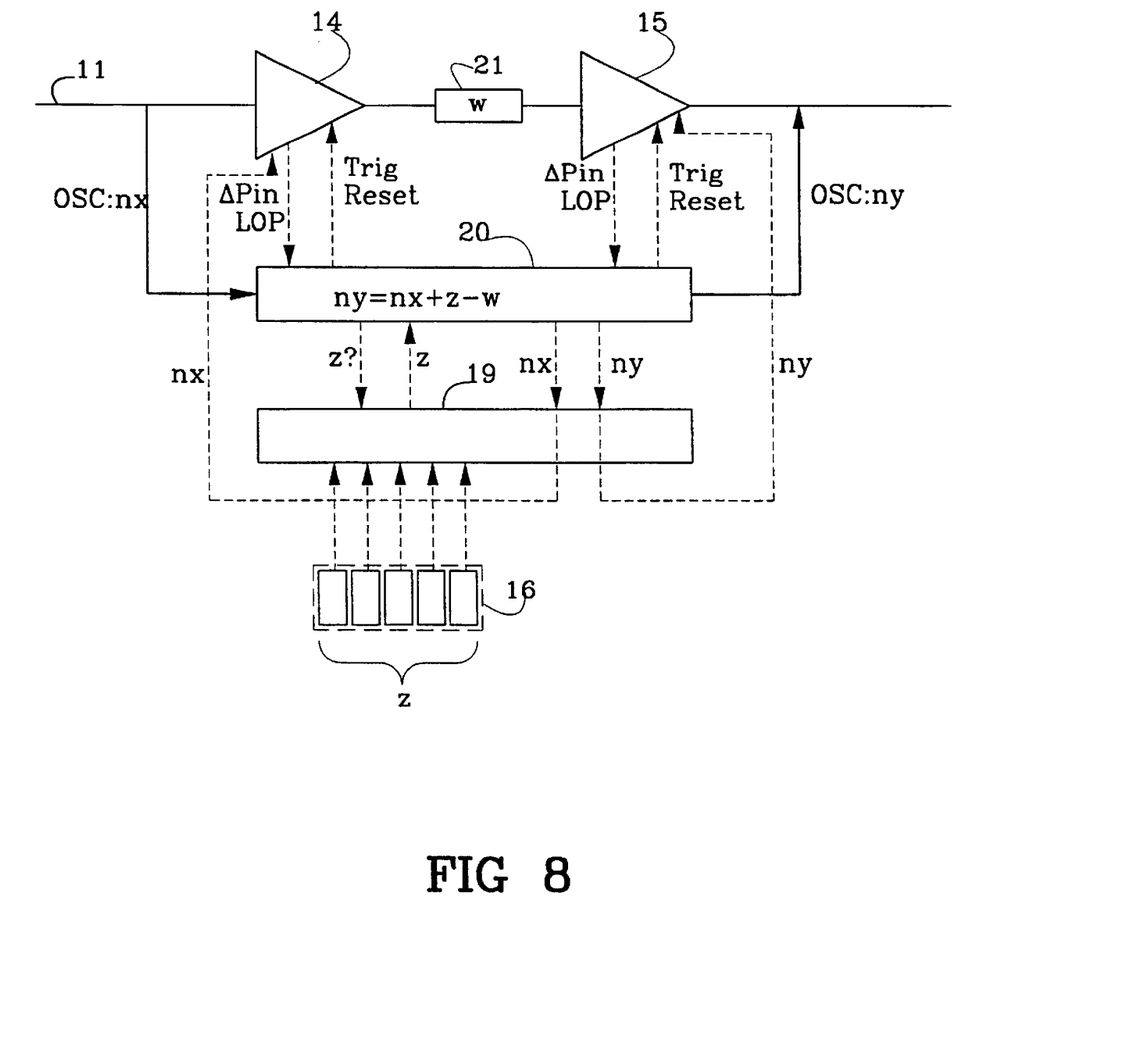
FIG. 8 shows a detailed view of a second embodiment of the implementation of the counting according to the invention.

In the FIGS. 7–9 the amplifiers 14, 15 also transmits a loss of power flag LOP. This is an indication of a fault on the incoming side of the amplifier. In the case of the preamplifier 14, this is an indication that the inactive segment IS should be moved to this place. Thus, the node becomes an end-node and the number n must be changed to the number of active transmitters in the node.

Amplifier Control

Figure 10:
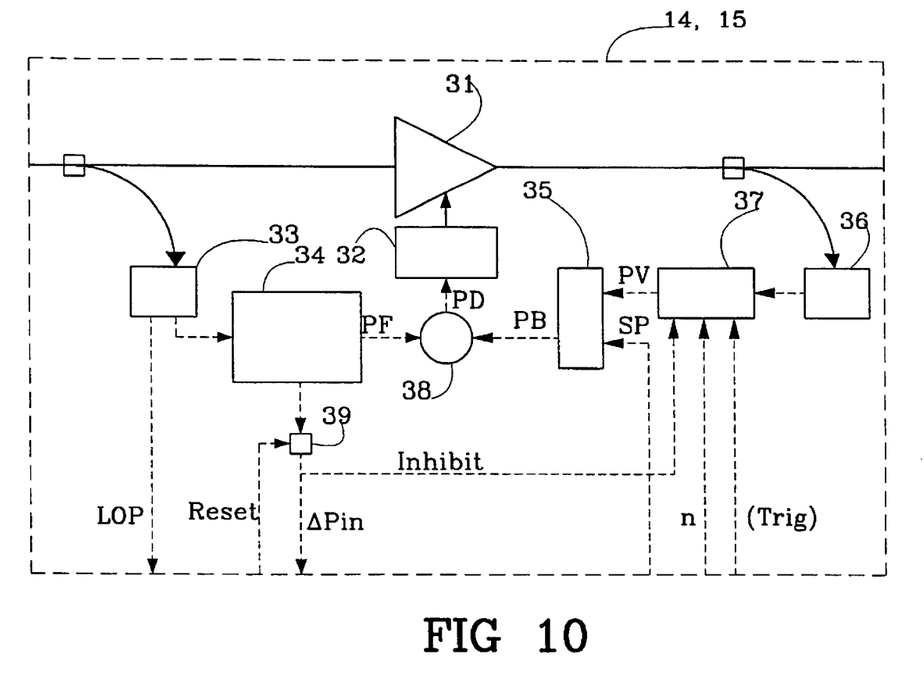
FIG. 10 shows an example of a control circuit where the counting of the channels may be used.

The actual control of the amplifiers could be implemented with feed-forward and feedback, as in FIG. 10. What in earlier figures was called an optical amplifier corresponds to the whole of FIG. 10. An erbium doped fibre 31, working as amplifier, is controlled by a pump laser 32. A first detector 33 reads the total optical power at the input of the erbium doped fibre 31 and forwards the value to a feed-forward block 34. From the feed-forward block 34 a feed-forward process demand signal PF is sent which controls the erbium doped fibre 31 by controlling the output power of the pump laser 32.

The feed-forward block 34 provides a preferably non-linear function of the total optical power and can be realised with the aid of an analogue non-linear network, for example. Another alternative is to solve it digitally by A/D converting the optical input power into an eight-bit-word, for example. This eight-bit-word can then be used by different values of the eight-bit-word indicating different memory addresses in a memory.

The feedback functions by measuring the output power of the erbium doped fibre 31 by a detector 36. The output power goes to a feedback block 37, where it is divided with the number of channels n, thereby providing a process value PV. In a controller 35 the process value PV is compared to the desired channel output power, i.e. a set point SP. In accordance with the programming of the controller 35, the controller 35 emits a feedback process demand signal PB which controls, via the pump laser 32 the channel output power of the erbium doped fibre 31, so that it approaches the desired output.

This adjustment does not of course take place instantaneously. When the feedback process demand signal PB via the pump laser 32, changes the channel output power of the erbium doped fibre 31, the conditions may already have been changed, which would require a new measurement of the channel output power of the erbium doped fibre 31, thus providing a new feedback process demand signal PB. This process takes place continually and a negative feedback control loop is created which, with a certain time delay, adjusts the output power of the erbium doped fibre 31 so that it is always in the vicinity of the desired value.

To use feed-forward makes the control rapid, since disturbances can be corrected at once. Feed forward requires, however, much knowledge of the behaviour of the system, since the result cannot be seen. It can be compared to driving a car blindfolded; one must know exactly how much to turn the wheel at each curve in order not to end up in the ditch.

Negative feedback, on the other hand, is reliable since the result is observed and adjustments are made thereafter. The disadvantage is that the automatic control cannot be effected however rapidly one may wish, since the control will then risk becoming unstable. In this case the optical amplifier also has a time constant of about 2–3 ms, which sets a limit to how rapid the feedback control can be made. If one combines, however, the feedback with the feed-forward, a rapid rough adjustment is achieved with the aid of the feed-forward and a not so rapid fine adjustment is achieved with the aid of the feedback.

FIG. 10 shows a combination means 38 which combines the feed-forward process demand signal PF with the feedback process demand signal PB and provides an output signal PD, for the control of the pump laser 32. The combination block 18 can be an adder or a multiplier, but also other combination functions are conceivable.

The detector 33 at the input of the amplifier provides the loss of power flag LOP. The feed-forward block 34 provides the input power change flag ΔPin via a flip-flop 39. The flip-flop 39 is reset by the reset signal from the optical supervisory unit.

The feedback block 37 receives the number of channels n and a trigger signal, if any. In addition, the feedback block 37 receives the input power change flag ΔPin from the flip-flop 39, which inhibits updating of the number n.

The setpoint SP and the level of the loss of power flag LOP may be setable from the central processor 19.

This was an example of a control circuit. The feed forward and feed back loops may also be used separately.

What is claimed is:

1. A method for controlling an output power of an optical amplifier in a node in a network, wherein the output power of the amplifier is controlled via a pump laser in a control circuit, comprising the steps of:

said node reading a supervisory channel, said supervisory channel including information on a number of channels coming in to the node for control of the amplifier;

said node using said number of channels coming in to the node for controlling the amplifier;

monitoring an input power to the amplifier; and setting an input power change flag if the input power is changed more than a certain limit, wherein the set input power flag inhibits further change of the control of the amplifier until a reliable number of channels is received.

2. The method according to claim 1, further comprising the steps of:

measuring the total output power from the amplifier; and dividing the total output power from the amplifier by the number of channels coming in to the node, which provides the total output power per channel, which is used for controlling the amplifier.

3. The method according to claim 1, further comprising the step of obtaining, by the node, a new number of channels for transmission to at least one node downstream by adding the number of additional channels in the node and subtracting the number of blocked or terminated channels in the node.

4. The method according to claim 3, further comprising the steps of measuring the total output power from the amplifier;

dividing the total output power from the amplifier by the new number of channels, thereby calculating the total output power per channel; and controlling the amplifier according to the total output power per channel calculated.

5. The method according to claim 3, wherein the number of added channels is obtained from the number of active transmitters in the node.

6. The method according to claim 1, further comprising the step of the number of channels to the control circuit for use thereby.

7. The method according to claim 1, further comprising the step of delaying the using step until a trigger signal is sent to the control circuit.

8. A node in a network comprising:
   a central processor;
   a supervisory unit;
   at least one optical amplifier; and
   a control circuit comprising a pump laser for controlling the output power of the at least one optical amplifier, the node being disposed to read a number of channels coming in to the node sent in a supervisory channel for controlling the amplifier and disposed to monitor input power to the amplifier and to set an input power change flag if the input power is changed more than a certain limit, wherein the set input power flag is disposed to inhibit further change of the control of the amplifier until a reliable number of channels is received.

9. The node according to claim 8, wherein the node is disposed to measure total output power from the amplifier and divide it with the number of channels coming in to the node.

10. The node according to claim 8, wherein the node is disposed to obtain a new number of channels for transmission to a node downstream by adding the number of added channels in the node and subtracting the number of blocked or terminated channels in the node.

11. The node according to claim 10, wherein the node is disposed to measure total output power from the amplifier and to divide the measured total output power with the new number of channels.

12. The node according to claim 10, wherein the node is disposed to obtain the number of added channels from a number of active transmitters in the node.

13. The node according to claim 8, wherein the supervisory unit is disposed to transmit the number of channels to the control circuit for use thereby.

14. The node according to claim 8, wherein the central processor is disposed to transmit the number of channels to the control circuit, the optical supervisory unit being disposed to transmit a trigger signal to the control circuit.

15. A network, comprising:
    at least one communication path;
    at least two nodes each comprising at least one optical amplifier, each of the at least two nodes communicating over the at least one communication path; and
    a control circuit comprising a pump laser for controlling an output power of said at least one optical amplifier, so as to control the at least one optical amplifier by a number of channels coming in to the node sent in a separate channel and disposed to monitor input power to the amplifier and to set an input power change flag if the input power is changed more than a certain limit, wherein the set input power flag is disposed to inhibit further change of the control of the amplifier until a reliable number of channels is received.

16. The network according to claim 15, wherein the information comprises the number of channels coming in to the node.

17. The network according to claim 16, wherein each node is disposed to obtain a new number of channels for transmission to a node downstream by adding the number of additional channels in the node and subtracting the number of blocked or terminated channels in the node.

* * * * *